May 31, 1960  E. D. NYSTRAND  2,938,319
APPARATUS FOR HANDLING CYLINDRICAL OBJECTS
Filed Nov. 4, 1957  3 Sheets-Sheet 1
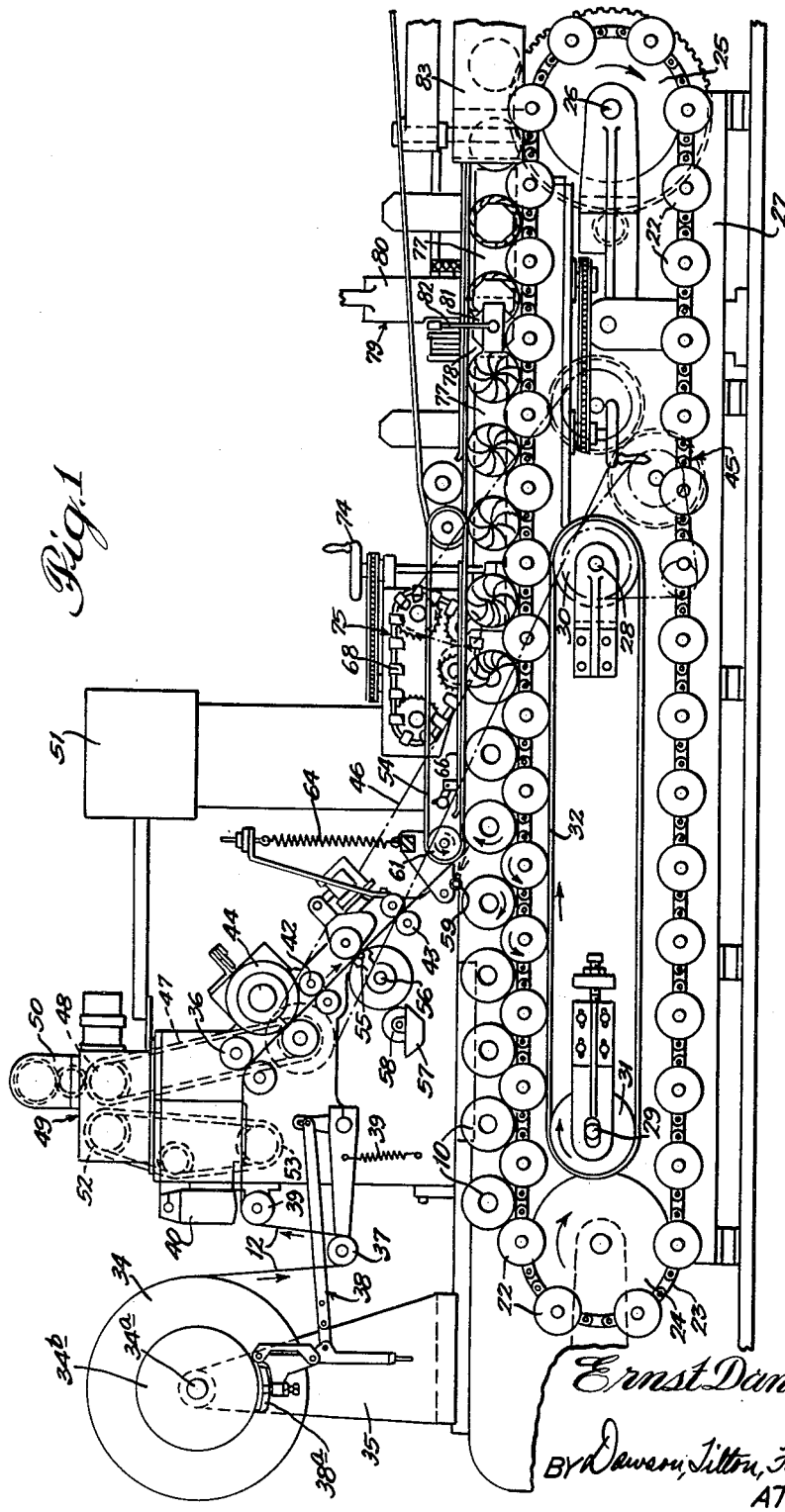
INVENTOR:
Ernst Daniel Nystrand,
BY Dawson, Tilton, Fallon & Lungmus,
ATTORNEYS.

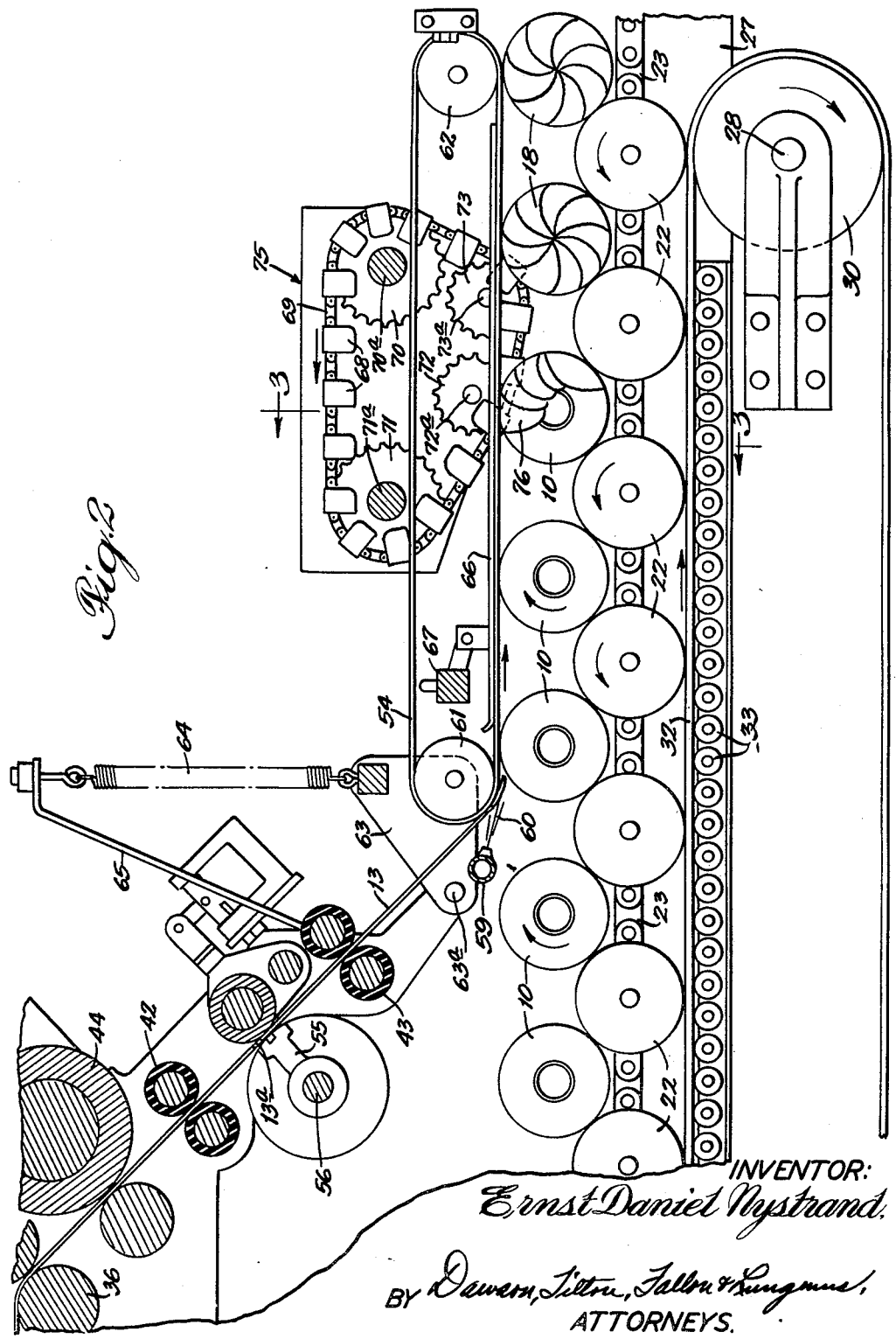

May 31, 1960  E. D. NYSTRAND  2,938,319
APPARATUS FOR HANDLING CYLINDRICAL OBJECTS
Filed Nov. 4, 1957  3 Sheets-Sheet 3
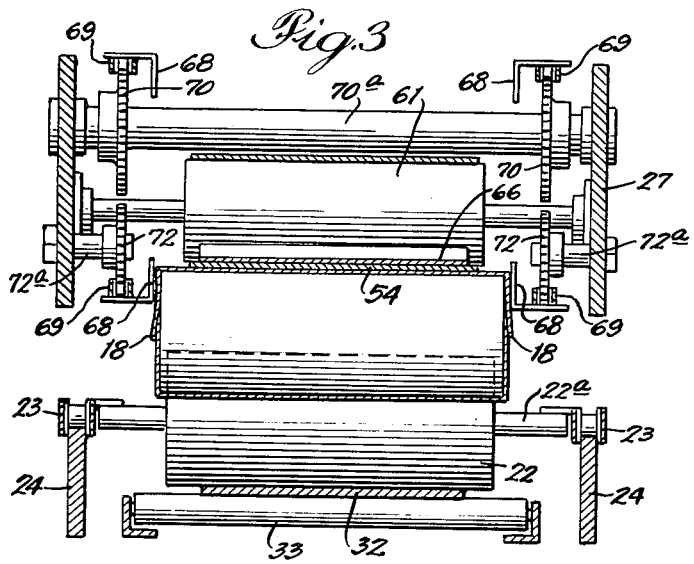
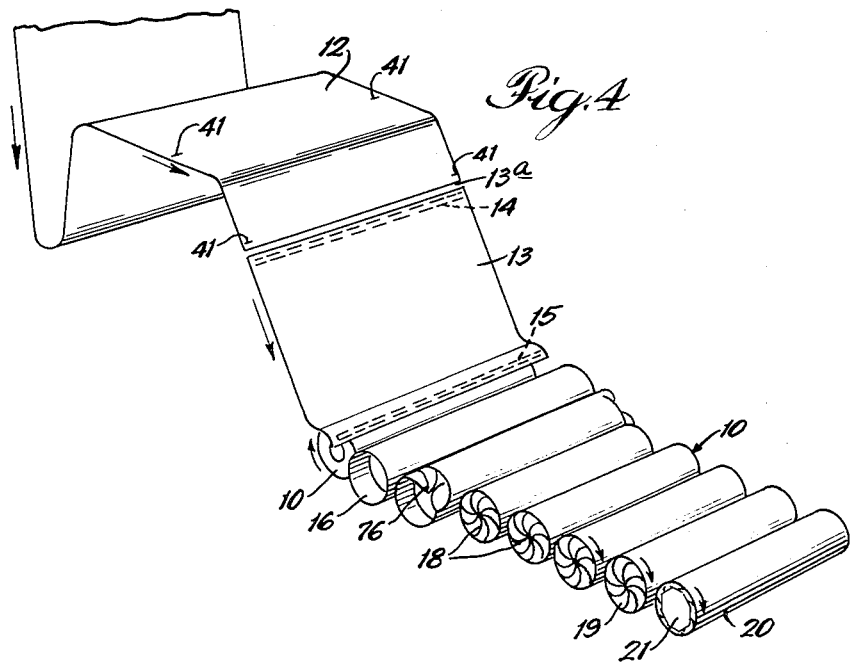
INVENTOR:
Ernst Daniel Nystrand,
BY Dawson, Tilton, Fallon & Lungmus
ATTORNEYS.

United States Patent Office 2,938,319
Patented May 31, 1960

2,938,319

APPARATUS FOR HANDLING CYLINDRICAL OBJECTS

Ernst Daniel Nystrand, Green Bay, Wis., assignor to Paper Converting Machine Co., Inc., Green Bay, Wis., a corporation of Wisconsin Filed Nov. 4, 1957, Ser. No. 694,423

4 Claims. (Cl. 53—214)

This invention relates to a method and apparatus for handling cylindrical objects. Its utility may be exemplified in the handling of cylindrical objects for wrapping, banding, or the like. Typical cylindrical objects for these purposes include rolls of paper such as tissue or toweling.

In the handling of cylindrical objects, there is an ever-increasing emphasis on speed. This is particularly true where the cylindrical objects are mass-produced, inexpensive items such as rolls of paper toweling and tissue. To make production of these items economically attractive, the methods and machines employed must not only be characterized by high speed, but also assurance against failure or other types of faulty operation. In order to achieve the desired high speed, involved methods and complicated machines have been employed in the past. The very complexity of the methods and machines, however, frustrates the achievement of fault-free operation continuously and for prolonged periods. It is to be appreciated that machines concerned with the production of paper products in particular often run continuously day and night for a week or more.

This problem has largely been overcome in methods and machines dealing with continuous webs of material. It is still present, however, in those operations concerned with manipulating a series of similar objects such as rolls of paper. In any processing operaton on such items, it is mandatory that the items be advanced through successive stations in a predetermined time sequence. The matter of timing or spacing, therefore, was felt to be the dominant problem and the one that had to be solved before any attack could be made on the speed problem. Without proper timing of the objects as they pass through successive stations, the primary objective of continuous operation could not be achieved. To establish the desired timed relationship in the movement and handling of cylindrical objects, the emphasis in the past has been on reciprocating mechanisms and operations.

The use of reciprocatory mechanisms in order to maintain cylindrical objects in proper relation has provided a definite limitation on speed. At the same time, the wear such movement introduces into the machine parts limits their effective life.

It is, therefore, a general object of this invention to provide a method and apparatus for handling cylindrical objects that overcomes the problems and disadvantages outlined above. Another object is to provide a method and apparatus that is suited for the handling of cylindrical objects for wrapping, banding, or the like. Still another object is to provide a method and apparatus of the character described in the objective immediately preceding and which is characterized by the absence of the reciprocatory movements employed in this connection heretofore. Yet another object is to provide a method and apparatus for the handling of cylindrical objects which permits the achievement of high speed handling for extended periods.

A further object is to provide a method and apparatus for the handling of cylindrical objects in which the object is cradled while it is advanced and rotated. Another object is to provide a method and apparatus for the handling of cylindrical objects in which the objects are supported at equally-spaced intervals with their axes parallel and during the support of the objects, rotating and advancing them at the same rate along the same path. Still another object is to provide a method and apparatus of the character set forth in the object immediately preceding and in which the rotational movement of each object is responsible for wrapping the object in a rectangular web. Yet another object is to provide a method and apparatus for handling cylindrical objects in which the objects are advanced at equal intervals while rotating about their axes, whereby an enveloping wrapper is applied to an object and thereafter the overlapping edges of the wrapper are inwardly creased. A yet further object is to provide a method and apparatus for handling cylindrical objects in the manner set forth in the object immediately above and in which end seals are provided the creased edges. Other objects and advantages of this invention can be seen as this specification proceeds.

This invention will be explained in conjunction with the accompanying drawings, in which—

Fig. 1 is a front elevation of a machine embodying teachings of this invention; Fig. 2 is an enlarged fragmentary view, partially in section, of a portion of the machine shown in Fig. 1; Fig. 3 is a vertical sectional view taken along the line 3—3 of Fig. 2; and Fig. 4 is a perspective view of objects and materials handled by the machine in the practice of the invention, in various stages of handling.

It is believed that this invention will be more readily grasped by first referring to the portion of the drawing in which a cylindrical object is shown in various stages of handling. In Fig. 4, the numeral 10 designates generally a cylindrical object, exemplified, as indicated at 11, by an unwrapped roll of toweling. In Fig. 4, the numeral 12 designates a wrapping web, conveniently a paper web used for enveloping a cylindrical object such as the roll of toweling designated 11. The numeral 13 designates a severed or cut portion of the web which is of a length sufficient to wrap cylindrical object 10. Applied to the underneath trailing edge of portion 13 is an adhesive designated by the numeral 14, and at the leading edge of portion 13, a second adhesive is applied and designated by the numeral 15.

As roll 11 advances while rotating, as designated by the arrows shown in Fig. 4, the adhesive 15 on the leading edge of severed portion 13 engages roll 11 and further rotation of roll 11 wraps severed portion 13 about it, as shown at 16. The wrapping is now complete in so far as the curved side walls of object 10 are concerned, since adhesive 14 unites the underside of the trailing edge of severed portion 13 with the upper side of the leading edge of the severed portion 13. At this point, however, there are laterally-extending edges of severed portion 13 that remain to be handled to complete the wrapping of object 10.

The handling of the laterally-extending portions is achieved in this invention by creasing sector-like portions to fold them inwardly toward the axis of the cylindrical object 10, the beginning of the creasing being seen at 17 and completed at 18. Thereafter, the ends of the cylindrical objects are heated in the space between numerals 18 and 19, and the cylindrical object at station 20 is provided with a pair of end seals, one of which is seen and is designated by the numeral 21.

Excellent results have been obtained when the adhesive 15 applied to the leading edge of severed portion 13 is of a temporary nature. Various adhesives are available that will retain their adhesive quality for a period not longer than about twenty-four hours. On the other hand, the adhesive applied at the trailing edge and designated 14, is a permanent adhesive. Where the cylindrical object 10 to be wrapped is paper, it is desirable that the tail of the paper roll not be lost, as might be the case should adhesive 15 be a permanent adhesive.

From the foregoing, it is to be appreciated that a cylindrical object can be handled for wrapping or creasing through the utilization of a rotational movement. This can be utilized for a plurality of cylindrical objects, as by passing them through an operation in a predetermined timed sequence.

Referring now to Fig. 1, the numeral 10 again indicates a cylindrical object, which, for the sake of ease of understanding, is illustrated as a roll of toweling. The method and apparatus of this invention can, however, be utilized in the handling of many different kinds of cylindrical objects. Another obvious form of paper roll would be toilet tissue.

Cylindrical objects 10 are supported on a plurality of equally-spaced cams or rolls, as seen in both Figs. 1 and 2. Rolls 22 are rotatably mounted on a conveyor or link chain 23. Two such chains are provided, as can be appreciated from a consideration of Fig. 3, which shows the shafts 22a on which rolls 22 are rotatably mounted, to be pinned to chains 23. Chains 23 are entrained around sprockets 24 and 25, sprocket 25 being the driven sprocket. Sprocket 25 (only one of which is shown in Fig. 1) is driven by drive means (not shown) operative to rotate shaft 26 on which sprocket 25 is mounted and which shaft is suitably journaled in bearings (also not shown) provided in frame 27.

Also journaled in frame 27 are shafts 28 and 29, which lie intermediate the upper and lower runs of chain 23 and which carry flat pulleys 30 and 31, respectively. Entrained over pulleys 30 and 31, is belt 32, which, on its upper run, abuts the bottom portions of rolls 22. As seen best in Fig. 2, belt 32 is maintained against the bottom portions of rolls 22 by table rolls 33 provided on frame 27. Through drive means (also not shown) sprocket 30 is driven and causes belt 32 to travel faster than chain 23, whereby rolls 22 are caused to rotate— as indicated by the arrows seen in Figs. 1 and 2.

Thus, a series of cylindrical objects are cradled in spaced-apart relation and caused to advance along the same path at the same rate of speed while being continuously rotated about their axes, which are maintained in parallel relation.

The numeral 34 designates a roll of wrapping paper, or other type of web, which provides the web 12 previously referred to in connection with Fig. 4. Web 12, in turn, as pointed out above, provides a severed portion 13 which is seen only in Figs. 2 and 4.

Roll 34 is supported for rotational movement on pedestals 35. Web 12 is unwound from roll 34 by the action of feed rolls 36 which are suitably mounted in frame 27 and which are driven by drive means (not shown). Web 12, in passing from roll 34 to rolls 36, passes through a tensioning device which includes dance roll 37 and brake linkage generally designated by the numeral 38. As dance roll 37 moves upwardly or downwardly, depending upon the slack or tension in web 12 and the urging of spring 39, the linkage elements making up brake 38 are actuated to apply or release press on roll 34. For this purpose, spring 39 is connected between a lever arm connected to frame 27 and dance roll 37, the other end of spring 39 being secured to frame 27. For applying the braking or release pressure to roll 34, the shaft 34a supporting roll 34 between pedestals 35 is equipped with a drum 34b, against which a shoe 38a is releasably urged by the action of the linkage elements making up brake 38.

Web 12, after passing underneath dance roll 37, thereafter passes over guide roll 39 which is rotatably mounted in suitable bearings secured to frame 27. Supported above guide roll 39 by frame 27 is a scanning mechanism 40. Scanning mechanism 40 can conveniently take the form of an electronic device sensitive to markings on web 12 such as are indicated by the numeral 41 in Fig. 4. The markings 41 are register marks provided at equally-spaced intervals along the edges of web 12 and correspond in their spacing to the length of sheet necessary to wrap a particular cylindrical object, i.e., the length of severed portion 13.

After web 12 has passed through feed rolls 35, it is further drawn along a path directed angularly downwardly by secondary feed rolls 42 and 43 which are also suitably journaled on frame 27. Intermediate feed rolls 36 and 42, frame 27 provides a rotatably mounted cutting knife 44. Knife 44 is operatively associated with the conveyor chain 23 through a common drive mechanism designated generally by the numeral 45. Drive mechanism 45 includes a chain and sprocket arrangement designated 46, which is operative to rotate cutting knife 44 at the same linear velocity as sprocket 25 is rotated, the rotation of sprocket 25 advancing chain 23 and hence cylindrical objects 10. Secondary feed rolls 42 and 43 are rotated slightly faster than feed rolls 36 so as to provide a spacing of severed portions 13 designated by the numeral 13a in Figs. 2 and 4. For this purpose, it has been found desirable to rotate feed rolls 42 about 5% faster than feed rolls 36, and to rotate feed rolls 43 about 10% faster than feed rolls 36.

Through a chain and sprocket system designated by the numeral 47, the rotational speed of sprocket 25 (and hence conveyor chain 23) is directly communicated to a sprocket 48 mounted within a differential speed control device designated generally by the number 49. Also directly coupled with sprocket 48 is an electronic transmitting device 50 which senses the speed of sprocket 28 and hence conveyor 23. Transmitter 50 is effective to transmit a signal representative of this speed to amplifier 51 through suitable electrical connections, no shown. A similar type of signal is delivered to amplifier 51 by scanner 40, which is an indication of the rate of advance of web 12. Amplifier 51 is operative to deliver a signal to differential 49 so as to change the connection between sprocket 48 and sprocket 52, which in turn is coupled through a chain and sprocket system designated 53 to rotate feed rolls 36. Thus, where web 12 is advancing faster than is necessary to wrap successive cylindrical objects 10, a beat signal will be delivered from amplifier 51 to change the coupling between sprocket 48 and sprocket 52 so as to slow down web 12. Where web 12 is advancing too slowly, a different signal will be delivered to differential 49 from amplifier 51 which is productive of a speed up of feed rolls 36 and hence web 12.

Web 12, in the form of severed portion 13, is angularly downwardly directed by means of feed rolls 42 and 43 and suitable guides, not shown, into a nip formed by the abutment of cylindrical object 10 and endless belt 54, as can be appreciated from a consideration of Fig. 2. Thereafter, further advance of cylindrical object 10 under belt 54, coupled with the rotational movement imparted to object 10 by belt 32, causes object 10 to be wrapped automatically by severed portion 13. To effectuate the secure and permanent wrapping of object 10 by severed portion 13, adhesive is applied to the leading and trailing edges of severed portion 13, as has been referred to above. For this purpose, adhesive applicator member 55 is pivotally mounted as at 56 on frame 27 and is in intermittent contact with severed portion 13 between secondary feed rolls 42 and 43. As also pointed out above, the adhesive applied to the trailing edge is a permanent adhesive, inasmuch as the trailing edge of severed portion 13 is united to the leading edge portion to complete the wrap. Such adhesive can be conveniently maintained in pan 57 and transferred to glue applicator member 55 by means of transfer roll 58 (seen only in Fig. 1) Both pan 57 and transfer roll 58 can be conveniently mounted on frame 27 by means not shown.

To provide the previously referred to temporary adhesive which is applied to the leading edge of severed portion 13, a nozzle 59 is mounted on frame 27 and is directed into the nip formed by belt 54 and cylindrical object 10. As seen best in Fig. 2, adhesive in the form of a jet designated 60 is sprayed on the under side of severed portion 13 and also against cylindrical object 10. Where the adhesive designated 60 is temporary in its adhesive character, it is possible after a short time, to completely remove the enveloping wrapper from cylindrical object 10 without destroying or damaging any of the outer wall portion. Where cylindrical object 10 is a roll of toweling or toilet tissue, this means that no portion of the tail is lost.

Belt 54 is entrained about flat pulleys 61 and 62 and is suitably driven and tensioned therethrough. Pulley 61 is positioned at the feed end of the machine and cooperates with a cylindrical object 10 to establish the nip previously referred to into which severed portion 13 is introduced. The existence of the desired nip is provided by positionably mounting pulley 61 on frame 27 in a fashion that cylindrical object 10 can raise pulley 61. Positionably mounting pulley 61 is achieved through pivotally-mounted arms 63, which are triangular plate-like members and which carry at one corner pulley 61. At another corner, they are pivotally mounted as at 63a on frame 27, and at the third, or upper, corner are connected through a spring 64 to a projection 65 from frame 27. Thus, when no cylindrical object 10 is below belt 54, arm 63 pivots in a clockwise direction, as seen in Fig. 2, and decreases the spacing between pulley 61 and rolls 22. The limit to which this spacing can be decreased is governed by the extent to which spring 64 can be extended. When an object 10 is conveyed underneath pulley 61, the pulley, and hence belt 54, is caused to rise upwardly, thereby applying a slight compressing force to cylindrical object 10. In addition to compressing cylindrical object 10 to insure a good bond between temporary adhesive 15 on the underside of the leading edge of severed portion 13, belt 54, by virtue of running just slightly slower than belt 32, causes a cylindrical object 10, when a paper roll, to be wrapped somewhat tighter, thereby insuring a compact product.

Through the cooperation of belt 54, belt 32, and chain 23, the cylindrical object 10 is rotated to envelop itself in severed portion 13. Just slightly in excess of one revolution of cylindrical object 10 is required for this purpose. In this connection, the lower and forwardly-traveling run of belt 54 is maintained in spaced relation with belt 32 by means of guide 66, which is positionably mounted on frame 27 as at 67. Guide 66, as is best seen in Fig. 2, terminates short of the feed in end of belt 54, and, therefore, short of pulley 61. After a cylindrical object 10 has proceeded sufficiently along the length of belt 54 to be completely wrapped in severed portion 13, i.e., to achieve the configuration designated 16 in Fig. 4, the object then enters a creasing station to provide a configuration designated by the numerals 17 and 18 in Fig. 4. The structure responsible for this operation is seen most clearly in Figs. 2 and 3 and embodies a plurality of dogs or L-shaped creasing members 68 which are rigidly mounted on endless chain 69. Two sets of chains 69 are provided, one for the front and one for the rear side of the machine, and are spaced outwardly of the belt 54. Chains 69 are entrained over suitable sprockets 70, 71, 72 and 73, which sprockets are in turn mounted on shafts journaled in frame 27. Sprockets 70 are mounted on shaft 70a, which extends across the machine, and sprockets 71 are similarly mounted on shaft 71a. Sprockets 72 are mounted on stub shafts 72a, while sprockets 73 are similarly mounted on stub shafts 73a. The portion of frame 27 which supports shafts 70a–73a is positionably secured with respect to the remainder of frame 27 so that the entire sprocket and chain mechanism defined by numerals 68–73a can be raised or lowered with respect to conveyor chain 23 by means of hand wheel 74.

As a cylindrical object approaches the end creasing station generally designated 75 and including elements numbered 68–74, sector-like portions of the laterally overlapping edges of severed portion 13 are folded or creased inwardly toward the axis of cylindrical object 10, as designated by the numeral 76 in Figs. 2 and 4. The axially inward creasing is achieved through the contact between the overlapping edge portion of web 12 as wrapped around cylindrical objects 10 and L-shaped creasing members 68. The continued rotation of cylindrical object 10 presents uncreased portions at the upper portion of the object so as to contact successive creasing dogs 68 and thereby provide a plurality of inward creases 76 to ultimately achieve the configuration designated by the numeral 18 in Figs. 2 and 4. Exceptionally satisfactory results are obtained through the use of the pleating or creasing mechanism 75 when chain 69 is operated at about three times the speed of chain 23. The positionable relationship between mechanism 75 and the remainder of frame 23 permits the ready adaptation of the pleating mechanism to rolls or other cylindrical objects of different diameters.

After the end pleating step has been completed, requiring about one rotation of cylindrical object 10, the objects 10 thereafter are conveyed by chain 23 into a confined channel defined by side plates 77. Side plates 77 are heated and heat therefrom is conducted into the ends of objects 10. At about this point, the travel of belt 32 is ended, so that rolls 22 are no longer rotated. Hence, the objects 10 themselves no longer rotate about their own axes but are still maintained in a cradled, spaced relation while advancing along the same path by means of rolls 22. The heating plates are suitably supported on the frame 27 and are interrupted as at 78 to permit the mounting on frame 27 of an end sealing device and the access thereof to the ends of objects 10. The end sealing mechanism is designated generally by the numeral 79 and is of conventional construction. A magazine 80 mounts a number of end sealing disks which are coated on one of their faces with a thermoplastic adhesive. Such a disk is designated by the numeral 81 in Fig. 1 and is applied to the end of an object 10 by means of an oscillating arm 82.

Thereafter, the objects encounter once again heating plates 77 to further insure their adhesion to the ends of objects 10, after which they are gripped by a pair of vertically-disposed belts 83 mounted on frame 27. Belts 83 grip objects 10 while they are still cradled between rolls 22 and thereby avoid the possibility that the objects 10 would not be properly ejected from the cradled position within the spaces between rolls 22. At the same time, belts 83 apply opposed end pressures to objects 10 to further cause the end seals in the form of disks 81 to tightly adhere thereto. At the end of the travel of belts 83, the objects 10 can be deposited into a suitable transfer conveyor (not shown) and delivered to a multiple packaging station.

It is believed that a brief summary of the operation of the machine will be further helpful to the understanding of this invention, and for that purpose the following is set down:

*Operation*

A frame 27 supports a pair of chains 23 running lengthwise of the machine and which carry axially-supported rolls extending between the two runs of chains. The rolls are rotatable with respect to the chains and are arranged in parallel, equally-spaced relation. A cylindrical object 10 is deposited or cradled between each pair of adjacent rolls 22 and the rolls 22 are rotated by means of a belt 32, the rotation of the rolls 22 in turn rotating the cylindrical objects 10 in contact therewith. The objects 10, therefore, are automatically advanced along the same path and are able to enter a work station in a predetermined timed relation. The first operation performed on the rotating cylindrical objects 10 is the delivery thereto by means of feed rolls 36, 42, and 43, of a series of rectangular wrapping webs 13. Each wrapping web 13 is severed from an endless web 12 drawn from a rotatably mounted supply roll 34. Adhesive is applied to the leading and trailing edges of the web 13 on the underneath side thereof. The wrapping web 13 is introduced into a nip formed by the contact of cylindrical object 10 with belt 54 which is entrained around a pivotally-mounted pulley 61. The web 12 is provided with spaced register marks 41 which are sensed by a scanning device 40 and which scanning device is operative to regulate the speed of unwinding roll 34. The cutting or severing of web 12 is achieved by a rotary cutting knife 44 which is actuated by the incremental advance of chain 23 and thus the advance of the cylindrical objects 10. By varying the rate of advance of web 12 with respect to the operation of knife 44, a wrapping web 13 can be delivered to the above-described nip at a predetermined time.

Thereafter, the continuing rotation of cylindrical objects 10 under the influence of rotating rolls 22 causes the object 10 to wrap itself with wrapping web 13. As the wrapping step is completed, creasing dogs 68 sequentially engage laterally-extending portions of the wrapping web 13 to fold the overlapping edge portions on themselves and thereby provide a compact end covering for each end of cylindrical object 10. During the creasing operation, the already-wrapped cylindrical objects are slightly compressed by means of an endless belt bearing against their top portions as at 54. The creasing dogs are mounted on endless chains, which chains are movable toward and away from belt 54 in planes parallel with the direction of the travel of belt 54. Thus, it is possible to position dogs 68 vertically of the machine so that when cylindrical objects of greater diameter are handled by the machine, the dogs 68 are still properly positioned to commence a creasing operation beginning at about the axis of the cylindrical object.

Once the creasing operation has been completed, the cylindrical objects 10 stop their rotation but continue to advance and are heated by longitudinally-extending, vertically-disposed plates 77, during which heating end seals are applied to confine the already-provided crease and to make a permanently enclosed package. The end seals are further pressed against the creased portions of wrapping web 13 by the operation of vertically-disposed belts 83, which additionally serve to remove objects 10 from the cradled position they have been in when traveling along the length of the machine.

While in the foregoing specification an embodiments of the invention has been set forth in considerable detail for purposes of completely describing the invention, it will be apparent to those skilled in the art that numerous changes may be made without departing from the spirit and principles of the invention.

I claim:

1. In apparatus for handling of cylindrical objects, an endless conveyor having axially-supported rolls extending across the width thereof in equally-spaced relation, means for rotating said rolls, endless belt means movably positioned above the upper run of said conveyor for yieldingly contacting a cylindrical object cradled between adjacent rolls, means for delivering a series of rectangular wrapping webs between said rolls and said belt means, and means adjacent the sides of said endless belt means and spaced from the entering end of said belt means for inwardly folding the laterally-extending edge portions of said wrapping web on a rotating cylindrical object said inwardly folding means including a pair of endless chains, each equipped with a plurality of equally-spaced, inwardly-extending, L-shaped creasing members.

2. The apparatus of claim 1, in which the said chains are entrained about sprockets, and said sprockets are movable toward and away from said belt means in planes parallel to the direction of travel of said belt means.

3. In apparatus for handling of cylindrical objects, an endless conveyor having axially-supported rolls extending across the width thereof in equally-spaced relation, means for rotating said rolls, endless belt means movably positioned above the upper run of said conveyor for yieldingly contacting a cylindrical object cradled between adjacent rolls, means for delivering a series of rectangular wrapping webs between said rolls and said belt means, means adjacent the sides of said endless belt means and spaced from the entering end of said belt means for inwardly folding the laterally-extending edge portions of said wrapping web on a rotating cylindrical object, and end seal-applying means associated with said endless conveyor adjacent said folding means and remote from the entering end of said belt means.

4. In apparatus for the handling of cylindrical objects, an endless conveyor having axially-supported rolls extending across the width thereof in equally-spaced relation, means for rotating said rolls, endless belt means movably positioned above the upper run of said conveyor for yieldingly contacting a cylindrical object cradled between adjacent rolls, means for delivering a series of rectangular wrapping webs downwardly forwardly toward said conveyor between said rolls and said belt means, means above said conveyor for applying a permanent adhesive to the trailing edge of said web and nozzle means above said conveyor for directing temporary adhesive into the pocket formed by a web just engaging an object, means adjacent the sides of said endless belt means and spaced from the entering end of said belt means for inwardly folding the laterally-extending edge portions of said wrapping web on a rotating cylindrical object, and means adjacent the side of said endless belt means adjacent said inwardly folding means and remote from said entering end for applying end seals to wrapped objects.

References Cited in the file of this patent

UNITED STATES PATENTS

| | | |
|---|---|---|
| 539,659 | Adamson | May 21, 1895 |
| 833,896 | Rexroth et al. | Oct. 23, 1906 |
| 1,005,335 | Seigle | Oct. 10, 1911 |
| 1,414,674 | Skinner | May 2, 1922 |
| 1,417,956 | Varga | May 30, 1922 |
| 1,882,695 | Aldrich et al. | Oct. 18, 1932 |
| 1,945,086 | Schmitt | June 30, 1934 |
| 2,368,213 | Gerlach | Jan. 30, 1945 |
| 2,611,224 | Jensen | Sept. 23, 1952 |
| 2,638,725 | Hurter et al. | May 19, 1953 |